(12) United States Patent
Park et al.

(10) Patent No.: US 9,076,580 B2
(45) Date of Patent: Jul. 7, 2015

(54) COIL FOR ENHANCING THE DEGREE OF FREEDOM OF A MAGNETIC FIELD

(71) Applicant: LG ELECTRONICS INC., Seoul (KR)

(72) Inventors: Jun Park, Seoul (KR); Euntaek Jeoung, Seoul (KR); Kiwon Han, Seoul (KR); Buyoung Yang, Seoul (KR); Donghyun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/087,960

(22) Filed: Nov. 22, 2013

(65) Prior Publication Data

US 2014/0145810 A1    May 29, 2014

(30) Foreign Application Priority Data

Nov. 28, 2012   (KR) ........................ 10-2012-0135801

(51) Int. Cl.
*H01F 5/00* (2006.01)
*H01F 27/28* (2006.01)
*H01F 38/14* (2006.01)
*H02J 7/02* (2006.01)

(52) U.S. Cl.
CPC .............. *H01F 5/00* (2013.01); *H01F 27/2823* (2013.01); *H01F 38/14* (2013.01); *H02J 7/025* (2013.01)

(58) Field of Classification Search
CPC .............. H01F 27/004; H01F 27/2804; H01F 27/2828; H01F 5/04; H01F 17/0006; H01F 41/041
USPC ......... 336/107, 200, 232, 222, 223, 180, 143, 336/147
See application file for complete search history.

(56) References Cited

U.S. PATENT DOCUMENTS 4,590,453 A * 5/1986 Weissman ..................... 336/180

FOREIGN PATENT DOCUMENTS

JP           06-045148 A   *   2/1994

* cited by examiner

*Primary Examiner* — Mangtin Lian
(74) *Attorney, Agent, or Firm* — Ked & Associates, LLP

(57) ABSTRACT

A coil for forming an induced magnetic field may include a first coil bundle formed of a first conducting wire wound in a first direction, the first coil bundle having an inner space of a prescribed inner width, a second coil bundle formed of a second conducting wire wound in a second direction, the second coil bundle having a prescribed outer width that is smaller than the inner width of the first coil bundle, and a connector that electrically connects the first conducting wire and the second conducting wire to each other. The second coil bundle may be provided in the inner space of the first coil bundle. The conducting wires of the first and second coil bundles may be wound in opposite directions and gaps between coil bundles may be changed. Accordingly, the magnetic field can be more evenly distributed in a wider area while maintaining a constant inductance.

9 Claims, 15 Drawing Sheets

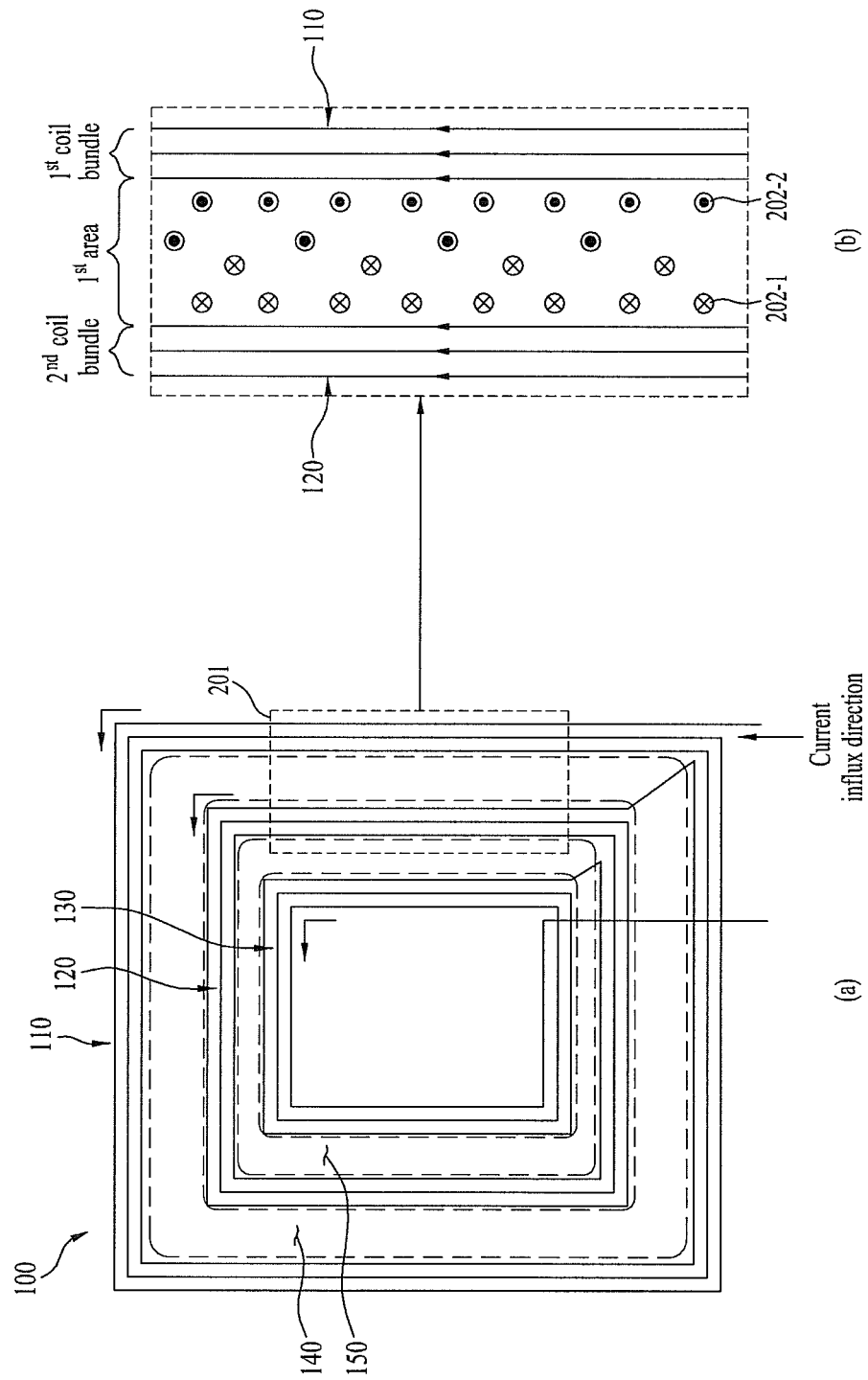

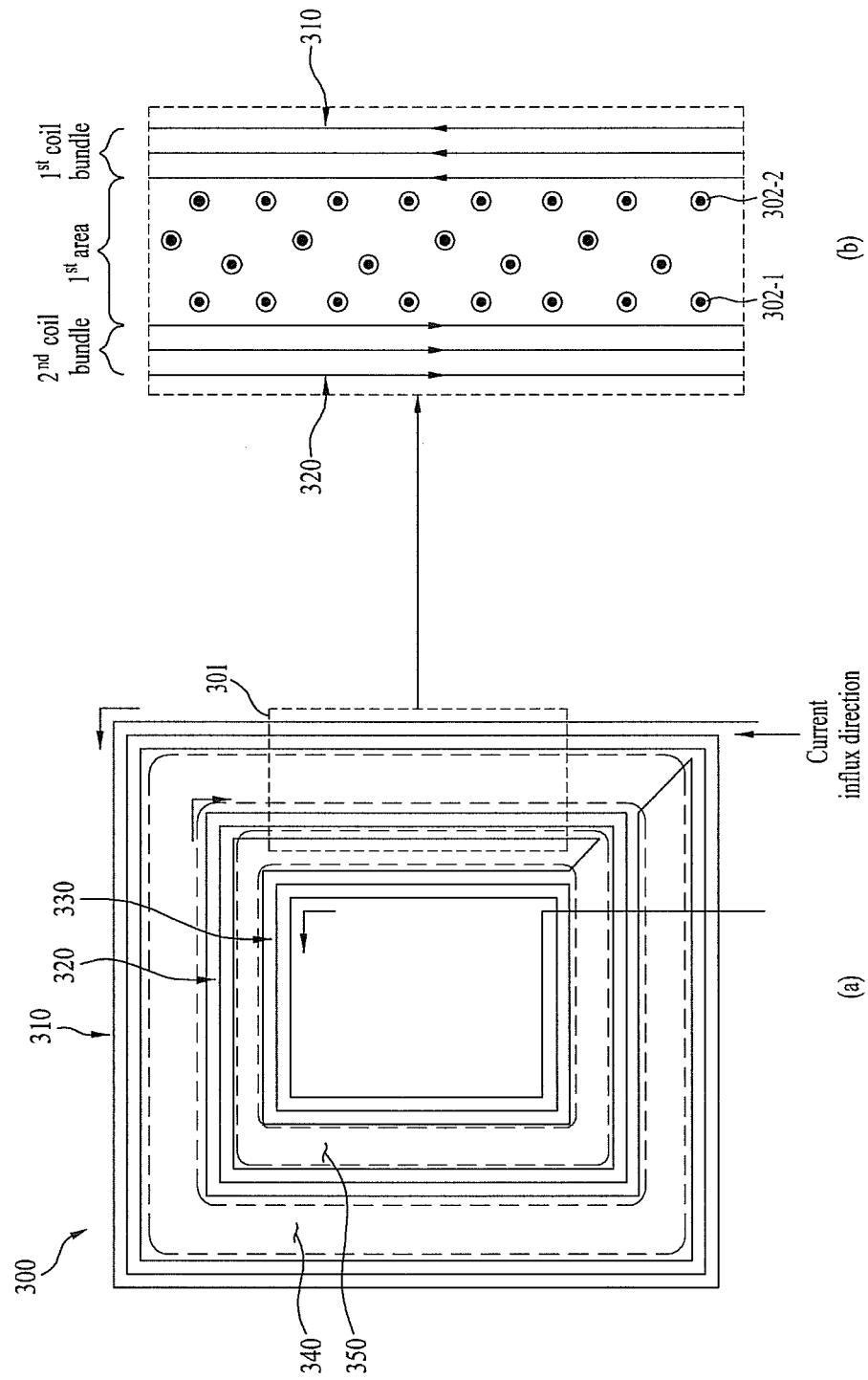

FIG. 5A
FIG. 5B
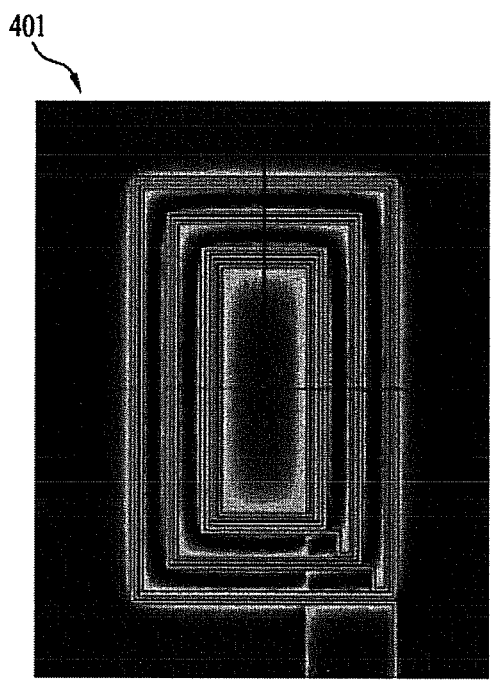
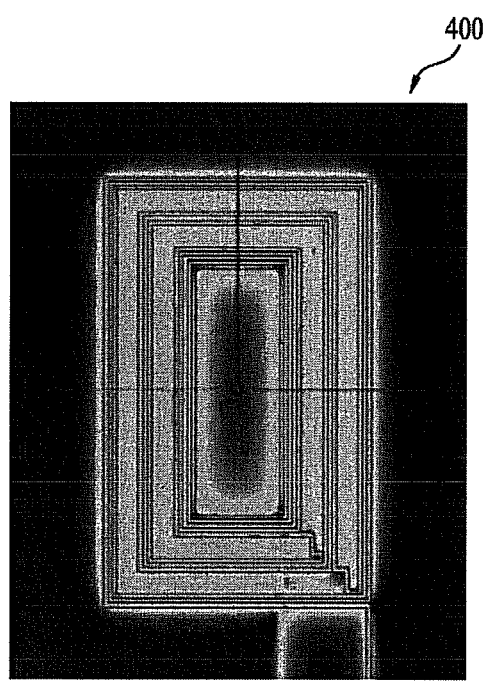

FIG. 8A
FIG. 8B
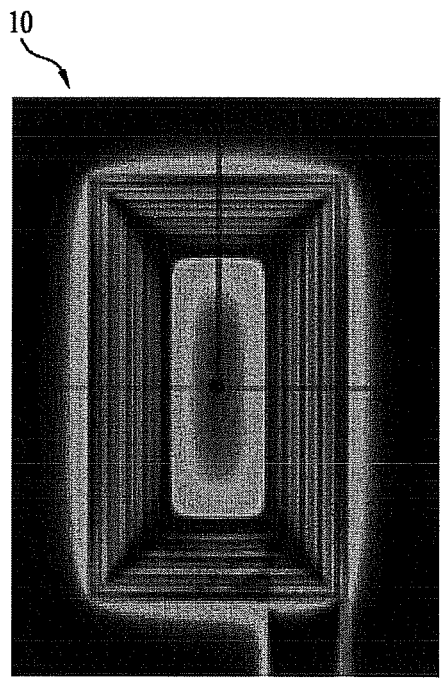
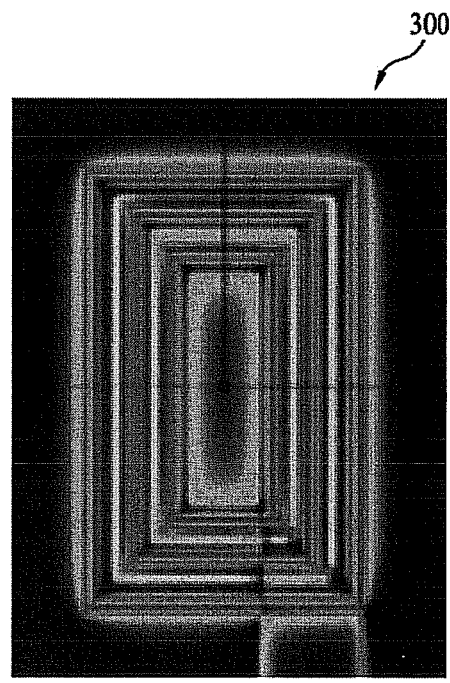

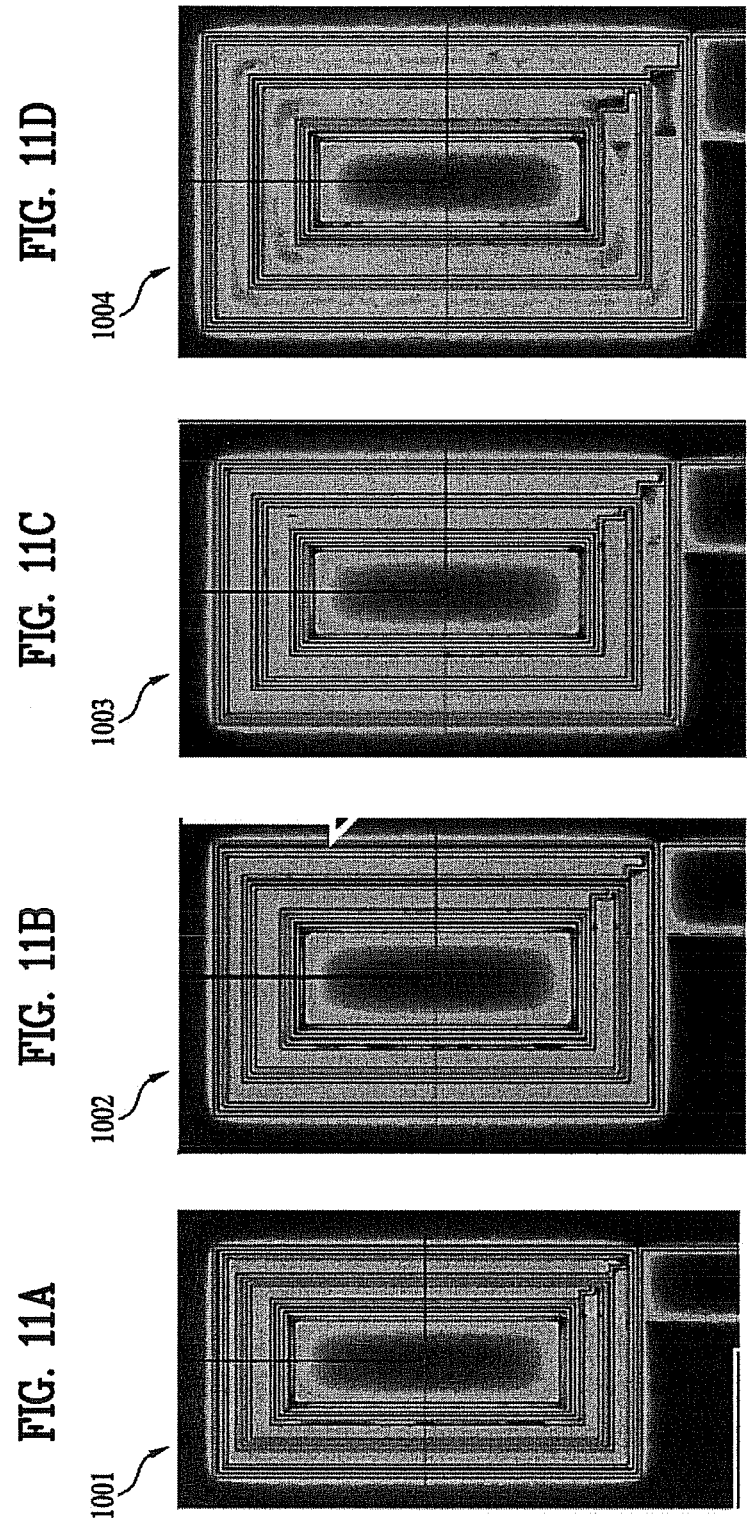

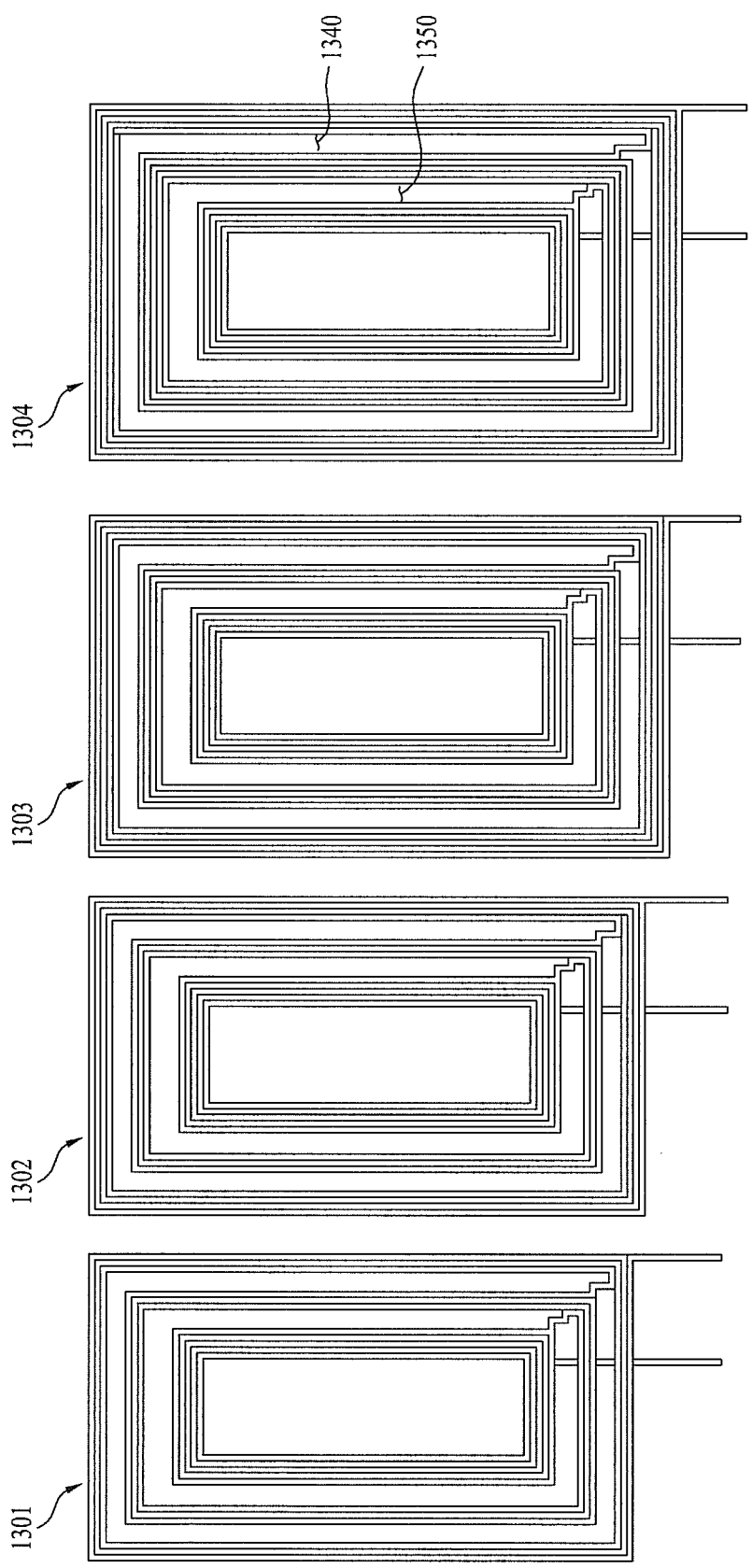

US 9,076,580 B2

COIL FOR ENHANCING THE DEGREE OF FREEDOM OF A MAGNETIC FIELD

CROSS-REFERENCE TO RELATED APPLICATION(S)

Pursuant to 35 U.S.C. §119(a), this application claims the benefit of earlier filing date and right of priority to Korean Application No. 10-2012-0135801, filed on Nov. 28, 2012, the contents of which are hereby incorporated by reference herein in their entirety.

BACKGROUND

1. Field

The present disclosure relates to a coil, and more particularly, to a structure of a coil. Although the present disclosure is suitable for a wide scope of applications, it is particularly suitable for enhancing the degree of freedom in controlling a distribution of a magnetic field.

2. Background

Generally, in order to generate a magnetic field, a conducting wire is wound to configure a coil structure and current can be then applied to the coil structure. The above-configured coil structure is applicable to various kinds of industrial fields.

Recently, many ongoing efforts are made to research and develop a wireless charging mechanism for charging a battery of a mobile terminal. As a method of delivering power to a mobile terminal wirelessly, there is a method of delivering power in form of an induced magnetic field. Thus, in delivering the power by induced magnetic field, a coil is configured and a current is then applied to the configured coil.

Particularly, since magnetic fields generated by an induced current that affects each other by construction and destruction, a structure of a coil can considerably affect distribution of the magnetic fields. Hence, in order to deliver power more efficiently, improved coil structures are necessary.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 2 is a diagram to illustrate a magnetic field generated by a coil structure shown in FIG. 1B;

FIG. 3 is a diagram of a structure of a coil according to one embodiment of the present disclosure;

FIGS. 5A and 5B are diagrams that illustrate the electromagnetic field generated by the coils of FIGS. 4A and 4B, respectively;

FIGS. 8A and 8B are diagrams that illustrate the electromagnetic field generated by the coils of FIGS. 7A and 7B, respectively;

FIGS. 11A to 11D are diagrams that illustrate the electromagnetic field generated by the coils of FIGS. 10A to 10D, respectively;

FIGS. 13A to 13D are diagrams that illustrate coils having different coil windings;

DETAILED DESCRIPTION OF THE DISCLOSURE

In the following detailed description, reference is made to the accompanying drawing figures which form a part hereof, and which show by way of illustration specific embodiments of the disclosure. It is to be understood by those of ordinary skill in this technological field that other embodiments may be utilized, and structural, electrical, as well as procedural changes may be made without departing from the scope of the present disclosure. Wherever possible, the same reference numbers will be used throughout the drawings to refer to the same or similar parts.

Figure 1B:
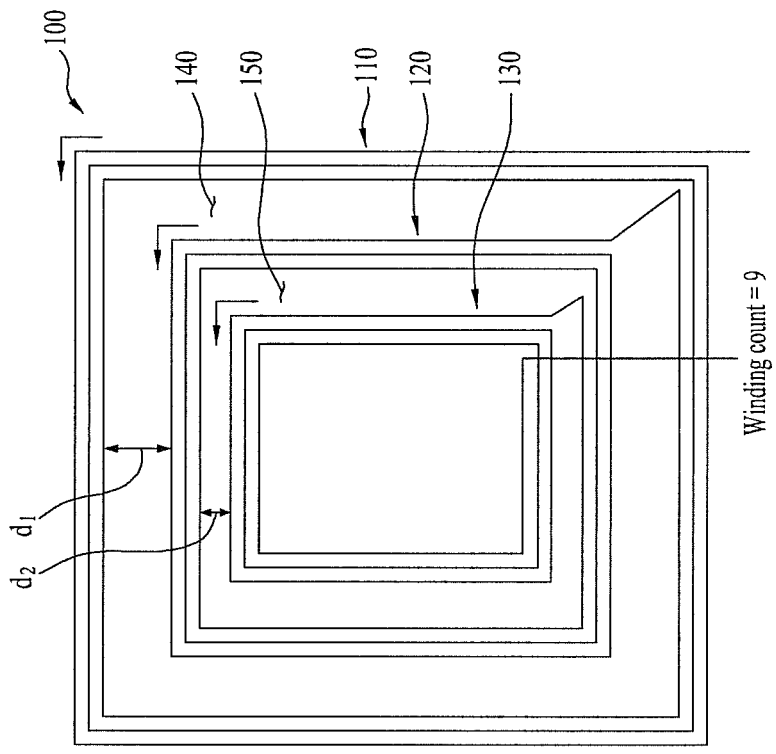
FIGS. 1A and 1B are diagrams of a structure of a coil according to one example.
Figure 1A:
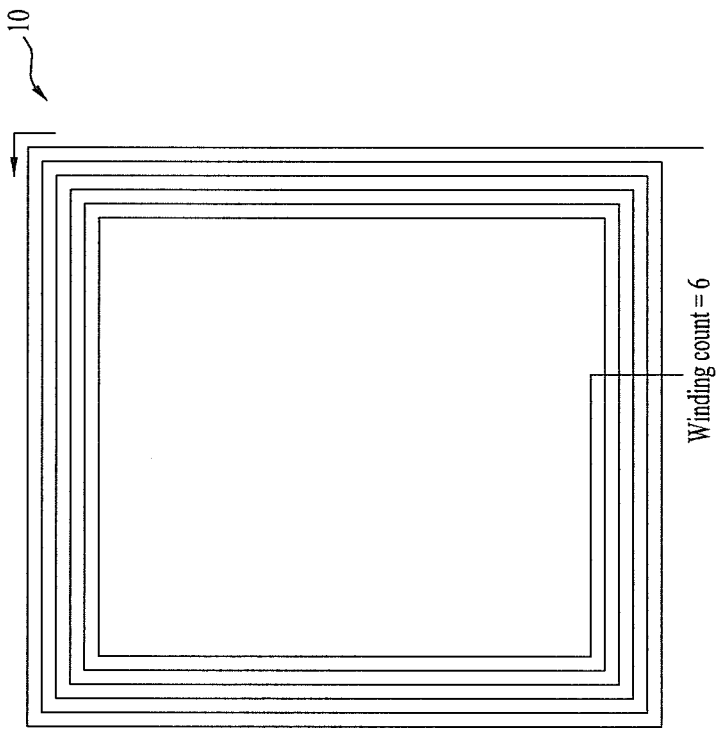

FIGS. 1A and 1B are diagrams of a structure of a coil according to one example. First of all, a coil may have a single conducting wire. While the conducting wire is wound to configure the coil, the wound conducting wire does not come in contact with itself. Regarding the coil structures shown in the accompanying drawings of the present specification, although conducting wires look as if coming in contact with each other, since the conducting wires are electrically insulated or do not come in touch with each other 3-dimensionally, they are not shorted (short-circuited).

A coil may have different characteristics depending on the count of windings (e.g., turns) of its conducting wire and configuration of the wound conducting wire. The count of windings in the structure of the coil disclosed in the present specification is exemplary. For clarity of the following description, the count of windings is disclosed as small as possible. Therefore, since the scope of the appended claims and their equivalents of the present disclosure is non-limited by the count of windings, the incremented count of windings does not deviate from the disclosure of the specification of the present disclosure.

The configurations shown in FIGS. 1A and 1B illustrate structures of a coil in a quadrangular planar shape. As mentioned in the foregoing description, in order to deliver power wirelessly signals, a magnetic field is generated using a transmitting coil structure. Generally, the above-generated magnetic field is configured on a wireless charging pad having a wide quadrangular planar shape shown in FIGS. 1A and 1B. If a mobile terminal including a receiving coil structure is placed on the wireless charging pad in the quadrangular planar shape, an electromotive force is generated according to laws of electromagnetic induction. Hence, electric charging can be performed using the generated electromotive force.

Meanwhile, according to the requirements for the above-configured transmitting coil structure for generating the magnetic field, a value of inductance should not be high and a strength of the generated induced magnetic field should be evenly distributed. If the value of the inductance gets high, a value of impedance of the inductance rises to cause consumption of a reactive power. Hence, it is desirable to maintain a constant value of the impedance.

On the other hand, in order to evenly distribute the strength of the induced magnetic field, if the winding count is simply incremented, it eventually causes an increase of the inductance value. In order to reduce or minimize increases in the inductance value, a coil structure that is capable of maintaining a constant inductance value despite incrementing the winding count are necessary. This is described in detail in comparison between FIG. 1A and FIG. 1B as follows.

In comparing the structures shown in FIG. 1A and FIG. 1B to each other, the example of the winding count is set in a manner in which inductance values of two coils are equal to each other. In particular, each of the coils shown in FIG. 1A and FIG. 1B has the same inductance.

Referring to FIG. 1A, when a conducting wire is wound (or coiled), it may be wound to have a first prescribed spaced distance (e.g., an inner space) and a winding direction may be counterclockwise. This structural property enables high inductance despite a small number of turns of coil. Hence, the winding count of the coil 10 shown in FIG. 1A is 6 times, which is smaller than that of the coil 100 shown in FIG. 1B. The structure of the coil 10 shown in FIG. 1A is disadvantageous in that it is unable to have a higher turn count in order to maintain a low inductance value. Hence, the coil shown in FIG. 1A is unable to generate a magnetic field in a wide area.

The structure of the coil 100 shown in FIG. 1B has an improved configuration that addresses the disadvantage of the former coil 10 shown in FIG. 1A. The coil 100 shown in FIG. 1B may include a first coil bundle 110 wound to have a first inner space, a second coil bundle 120 similar to the first coil bundle 110 and a third coil bundle 130 similar to the first coil bundle 110. In this case, the second coil bundle 120 may have a second inner space formed by the coils and the third coil bundle 130 may be provided inside the second coil bundle 120. Moreover, both the second and third coil bundles 120, 130 may be provided inside the first inner space of the first coil bundle 110. A connecting part may be provided between the coil bundles to connect the corresponding coil bundles to each other. The connecting part may be a connector, core, body or another appropriate structure to support or connect the conducting core.

Moreover, a gap may be formed between each of the coil bundles. For example, the first coil bundle 110 and the second coil bundle 120 may be spaced by a distance $d_1$, and the second coil bundle 120 may be spaced from the third coil bundle 130 by a distance $d_2$, as illustrated in FIG. 1B.

A winding direction of each of the coil bundles may each be counterclockwise. Thus, if the coil bundles of a predetermined winding count are configured and a prescribed spaced distance is maintained between the coil bundles, it is able to configure a structure of a coil having the same inductance despite a higher total winding count. As the coil structure can have the higher winding count, the coil shown FIG. 1B is capable of generating a magnetic field in an area greater than that generated by the coil structure shown in FIG. 1A.

Yet, since cancellation occurs between magnetic fields generated within the space 140, 150 between the coil bundles 110, 120, 130 in the coil structure shown in FIG. 1B, strength of the magnetic field in these areas may be rapidly weakened. Such a phenomenon is described in detail with reference to FIG. 2 as follows.

FIG. 2 is a diagram to illustrate the magnetic field generated by the coil structure shown in FIG. 1B. A coil bundle arranged on a most outer area is named a first coil bundle 110 and other coil bundles arranged inside the first coil bundle shall be named a second coil bundle 120 and a third coil bundle 130. A spaced area between the first coil bundle and the second coil bundle shall be named a first area 140. And, a spaced area between the second coil bundle 120 and the third coil bundle 130 shall be named a second area 150.

FIG. 2(b) shows an enlarged diagram of a region indicated by a reference number 201 shown in FIG. 2(a) to describe construction and/or destruction of a magnetic field formed in the region 201. Here, the second coil bundle 120 is shown to be on the left side of region 201, the first coil bundle 110 is shown to be on the right side of the region 201, and the first area 140 is between the first coil bundle 110 and the second coil bundle 120.

Considering an influx direction of a current, each of a direction of the current flowing through the second coil bundle 120 on the left side of the enlarged region and a direction of the current flowing through the first coil bundle 110 on the right side of the enlarged region is a bottom-to-top direction, as illustrated by the arrows. Hence, a first magnetic field 202-1 may be formed by the first coil bundle 110 and a second magnetic field 202-2 may be formed by the second coil bundle 120. By Ampere's Law, a direction of the second magnetic field 202-1 is in a direction projected from the drawing but a direction of the first magnetic field 202-1 is in a direction into the drawing.

Hence, the first magnetic field 202-1 and the second magnetic field 202-2 meet each other in the first area to cancel each other out. Due to cancellation of the magnetic fields, a strength of the magnetic field may be substantially 0 in the middle of the first area 140 and may approach a value close to 0 in regions near the middle.

In the above-mentioned structure, if a section having the magnetic field strength '0' is generated, a shadow zone is generated in a region for delivering power by wirelessly. In particular, if a receiving coil of a mobile terminal is situated at the location having the magnetic field strength '0', it is unable to receive power wirelessly.

In order to solve the above-mentioned problem, one embodiment of the present disclosure proposes that a winding direction of the first coil bundle is set opposite to that of the second coil bundle (e.g., opposite to that of an adjacent coil bundle). In the following description, a structure of a coil according to an embodiment of the present disclosure is explained with reference to FIG. 3.

FIG. 3 is a diagram of a structure of a coil according to one embodiment of the present disclosure. Referring to FIG. 3(a), a coil 300 according to one embodiment of the present disclosure may include a first coil bundle 310 wound to have a first prescribed spaced distance. A second coil bundle 320 similar to the first coil bundle 310 and a third coil bundle 330 similar to the first coil bundle 310 are provided inside the first coil bundle. A first prescribed distance $d_1$ (or gap) may be provided between the first and second coil bundles 310, 320, and second prescribed distance $d_2$ may be provided between the second and third coil bundles 320, 330 (cf. the reference numbers $d_1$, $d_2$ shown in FIG. 1B).

In particular, the winding directions of the coil bundles neighboring each other may be set different from each other. In more particular, if the winding direction of the first coil bundle is counterclockwise, the winding direction of the second coil bundle is clockwise and the winding direction of the third coil bundle is counterclockwise.

FIG. 3(b) shows an enlarged diagram of a region 301 shown in FIG. 3(a). The second coil bundle is shown on a left part of the region 301, the first coil bundle is shown on a right part of the region 301, and the first area 340 is provided between the first coil bundle 310 and the second coil bundle 320.

Considering an influx direction of a current, a current flows through the second coil bundle 320 on the left part of the enlarged region in a top-to-bottom direction, while a current flows through the first coil bundle 310 on the right part of the enlarged region in a bottom-to-top direction, as illustrated by the arrows. Hence, a first magnetic field 302-1 may be formed by the first coil bundle 310 and a second magnetic field 302-2 may be formed by the second coil bundle 320.

By Ampere's Law, a direction of each of the first magnetic field 302-1 and the second magnetic field 302-2 is a direction projected from the drawing. Thus, if each of the first magnetic field 302-1 and the second magnetic field 302-2 are formed in the same direction, it is able to generate a constructive phenomenon. The constructive phenomenon as illustrated in FIG. 3(*b*) can occur in the entire second area 350 as well as in the rest of the first area 340. Therefore, unlike the structure of the coil shown in FIG. 2, the destruction of the magnetic field occurs in neither the first area nor the second area.

Figure 4A:
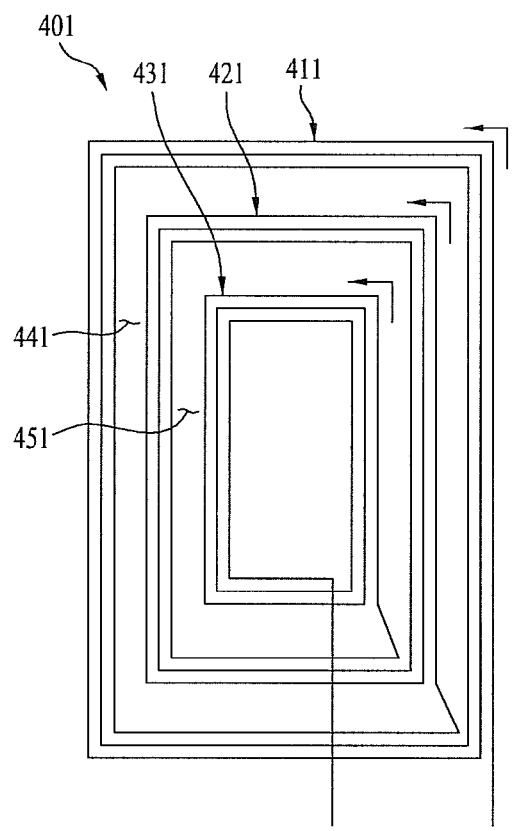
FIGS. 4A and 4B are diagrams that illustrate coils having different structures according to one example.
Figure 4B:
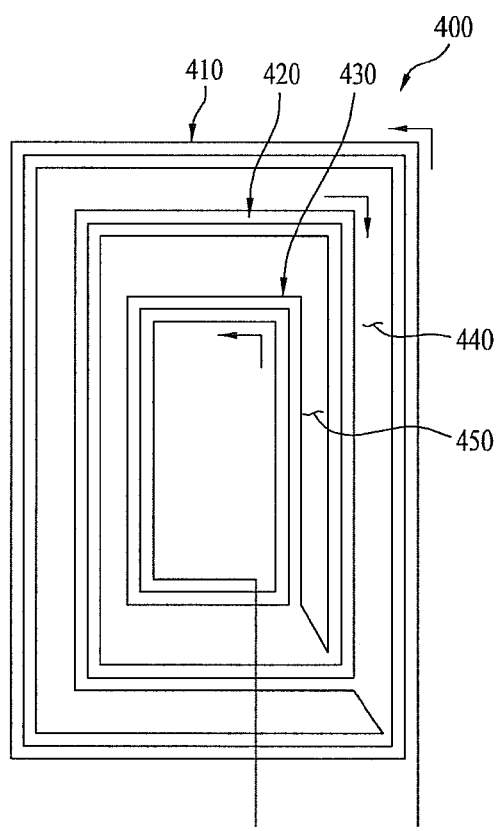
Figure 6:
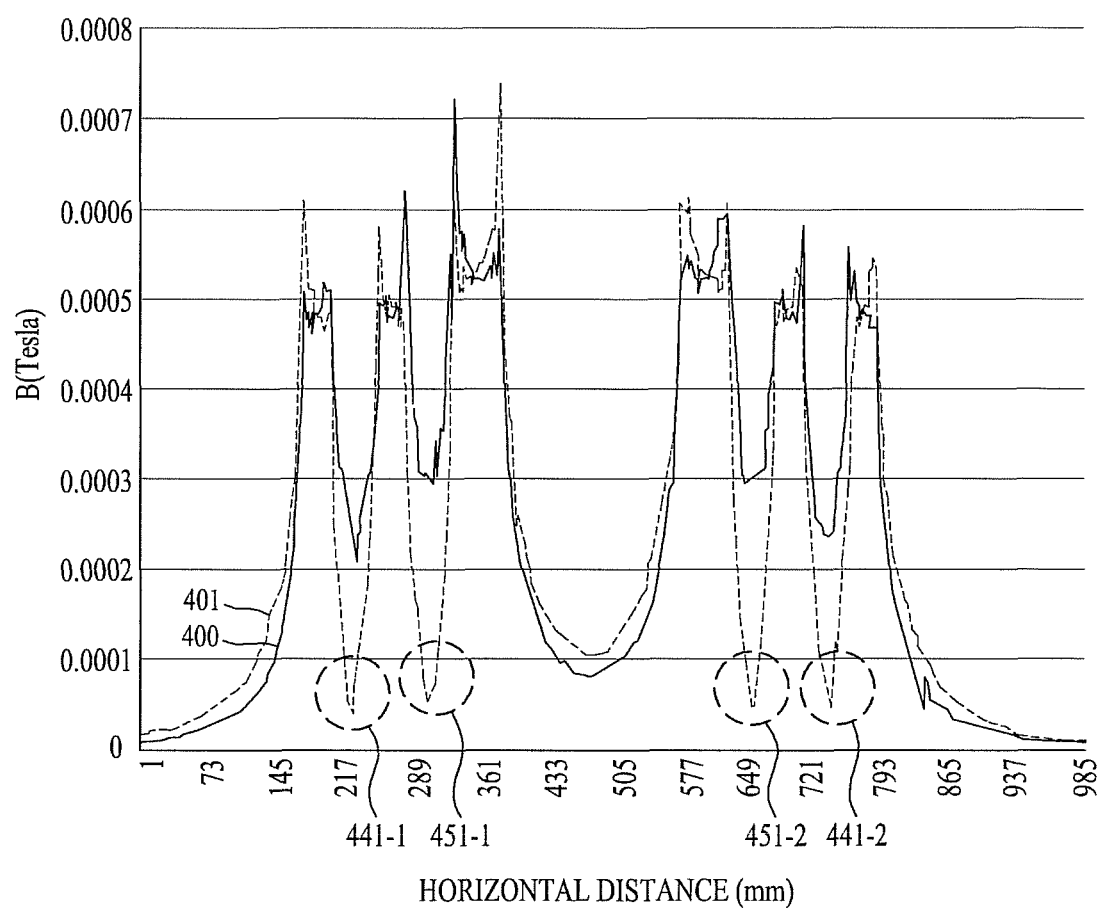
FIG. 6 is a chart that illustrates characteristics of the magnetic field of FIGS. 5A and 5B, respectively.

FIGS. 4 to 6 are diagrams for the simulation results of comparison between a structure of a coil according to one embodiment of the present disclosure and a structure of a general coil. FIG. 4A shows a coil having a structure as shown in FIG. 2(*a*) and FIG. 4B shows a coil having a structure as shown in FIG. 3(*a*).

FIGS. 5A and 5B show simulation results of the coils shown in FIGS. 4A and 4B. The simulation is performed by applying a current of 1 A and a frequency of an applied power is 150 kHz. Winding counts of the three coil bundles shown in each of FIG. 5A and FIG. 5B are set to 5 times, 3 times and 3 times, respectively. In FIGS. 5A and 5B, darker regions adjacent to the coils indicate a magnetic field free area. That is, in FIG. 5, lighter shading corresponds to a stronger magnetic field and darker shading corresponds to a weaker magnetic field.

Referring to FIG. 5A, looking into the magnetic field formed in the first area and the magnetic field formed in the second area, it can be observed that the generated magnetic fields are almost eliminated by the destructive interference. On the contrary, referring to FIG. 5B, looking into the structure of the coil where the coil bundles are wound in directions opposite that of an adjacent coil bundle, it can be observed that the magnetic field of a prescribed strength is formed in each of the first area 440 and the second area 450.

Therefore, a shadow region of the magnetic field, which may occur in the structure of coil 401, does not occur in the structure of the coil 400 according to one embodiment of the present disclosure.

FIG. 6 is a graph that illustrates magnetic field distribution of the simulation result with reference to a horizontal direction of each of the coil structures in the simulations shown in FIGS. 5A and 5B. In this case, the horizontal axis indicates a distance in a horizontal direction and the vertical axis indicates a strength of a magnetic field. Here, units of the horizontal and vertical axes are mm and Tesla, respectively.

In this graph, the dotted line corresponds to the structure shown in FIG. 5A (coil 401) and a solid line corresponds to the structure shown in FIG. 5B (i.e., coil 400). Looking into the simulation result of coil 401, the magnetic field strength rapidly decreases corresponding to the region 441. In particular, the magnetic field strength rapidly decreases at regions 441-1 and 441-2 by a destructive interference in the first area 441. Moreover, the magnetic field strength rapidly decreases at regions 451-1 and 451-2 by a destructive interference in the second area 451.

On the contrary, looking into the solid line corresponding to the result of the coil 400 according to one embodiment of the present disclosure, although the magnetic field strength decreases in each of the first and second areas 440 and 450, it can be observed that the magnetic field strength is maintained in each of the first and second areas 440 and 450 to some extent compared to that of coil 401.

Figure 7A:
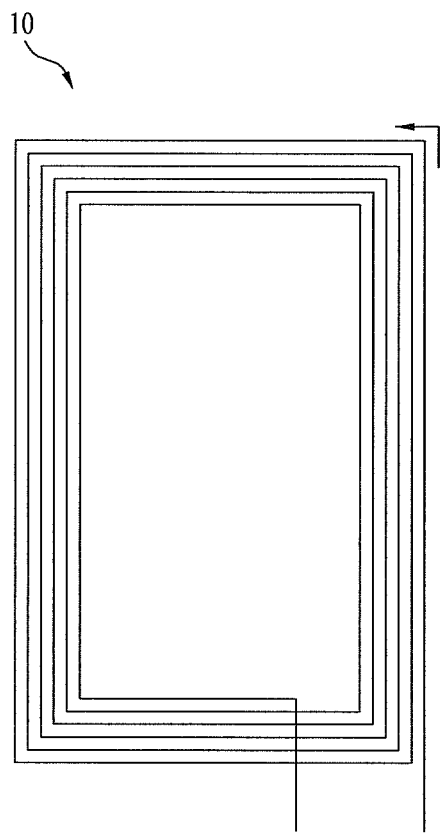
FIGS. 7A and 7B are diagrams that illustrate coils having different structures according to one example.
Figure 7B:
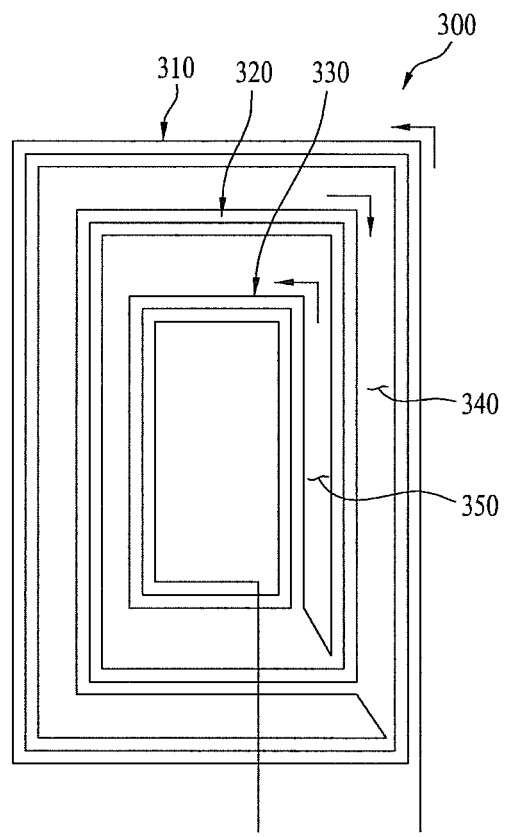
Figure 9:
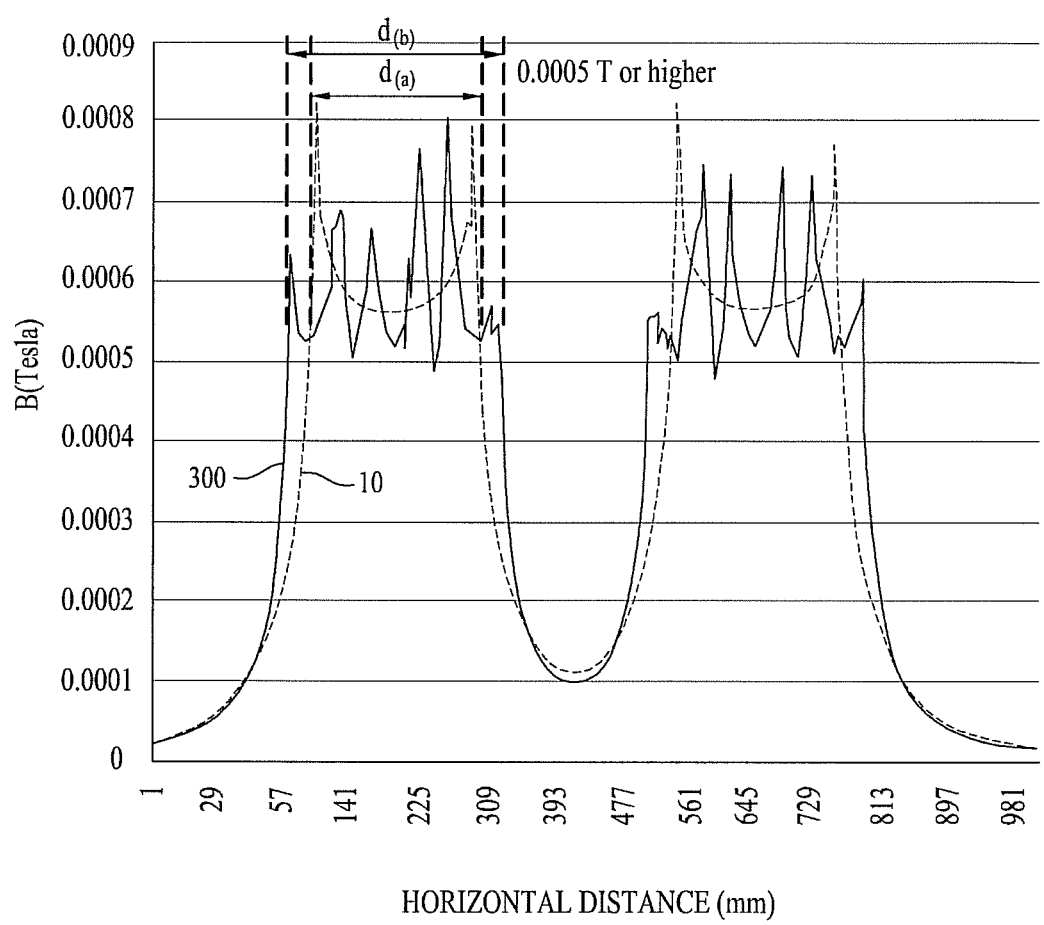
FIG. 9 is a chart that illustrates characteristics of the magnetic field of FIGS. 5A and 5B, respectively.

FIGS. 7 to 9 are diagrams for the simulation results of comparison between a structure of a coil according to one embodiment of the present disclosure and a structure of a general coil. FIG. 7A shows a coil 10 having a structure shown in FIG. 1(*a*) and FIG. 7B shows a coil 300 having a structure shown in FIG. 3(*a*).

FIGS. 8A and 8B show simulation results of the coils shown in FIGS. 7A and 7B. The simulation is performed by applying a current of 1 A and a frequency of an applied power is 150 kHz. A winding count of the coil 10 shown in FIG. 8A is set to 18 times, while a winding count of the coil 300 shown in FIG. 8B is set to 6 times for each coil bundle.

Referring to the simulation result shown in FIGS. 8A and 8B, it can be observed that a magnetic field is not formed in a wide area of the coil structure 10 shown in FIG. 8A. In particular, although FIG. 8A and FIG. 8B show the same winding count, it can be observed that the structure of the coil 300 according to one embodiment of the present disclosure has the magnetic field formed in a wider area. Thus, the extended distribution of the magnetic field can be clearly confirmed when view a graph as illustrated in FIG. 9.

FIG. 9 is a graph that illustrates magnetic field distribution of the simulation result with reference to a horizontal direction of each of the coil structures in the corresponding simulation results. In this case, a horizontal axis indicates a distance in a horizontal direction and a vertical axis indicates a strength of a magnetic field. Here, units of the horizontal and vertical axes are mm and Tesla, respectively. In this graph, the dotted line corresponds to the coil 10 shown in FIG. 8A and the solid line corresponds to the coil 300 shown in FIG. 8B.

Referring to FIG. 9, a length d(a) and a length d(b) indicate widths of magnetic fields over 0.0005 T in the coil structures, respectively. In the graph, it can be observed that the length d(b) is greater than the length d(a). Moreover, if each of the structures of the coils shown in FIGS. 7A and 7B has the same winding count, the structure shown in FIG. 7A has a greater inductance value. Therefore, the structure of coil 300 shown in FIG. 7B can exhibit a more even distribution of the magnetic field strength in a wider area despite having inductance smaller than that of the coil 10 shown in FIG. 7A.

Figure 12:
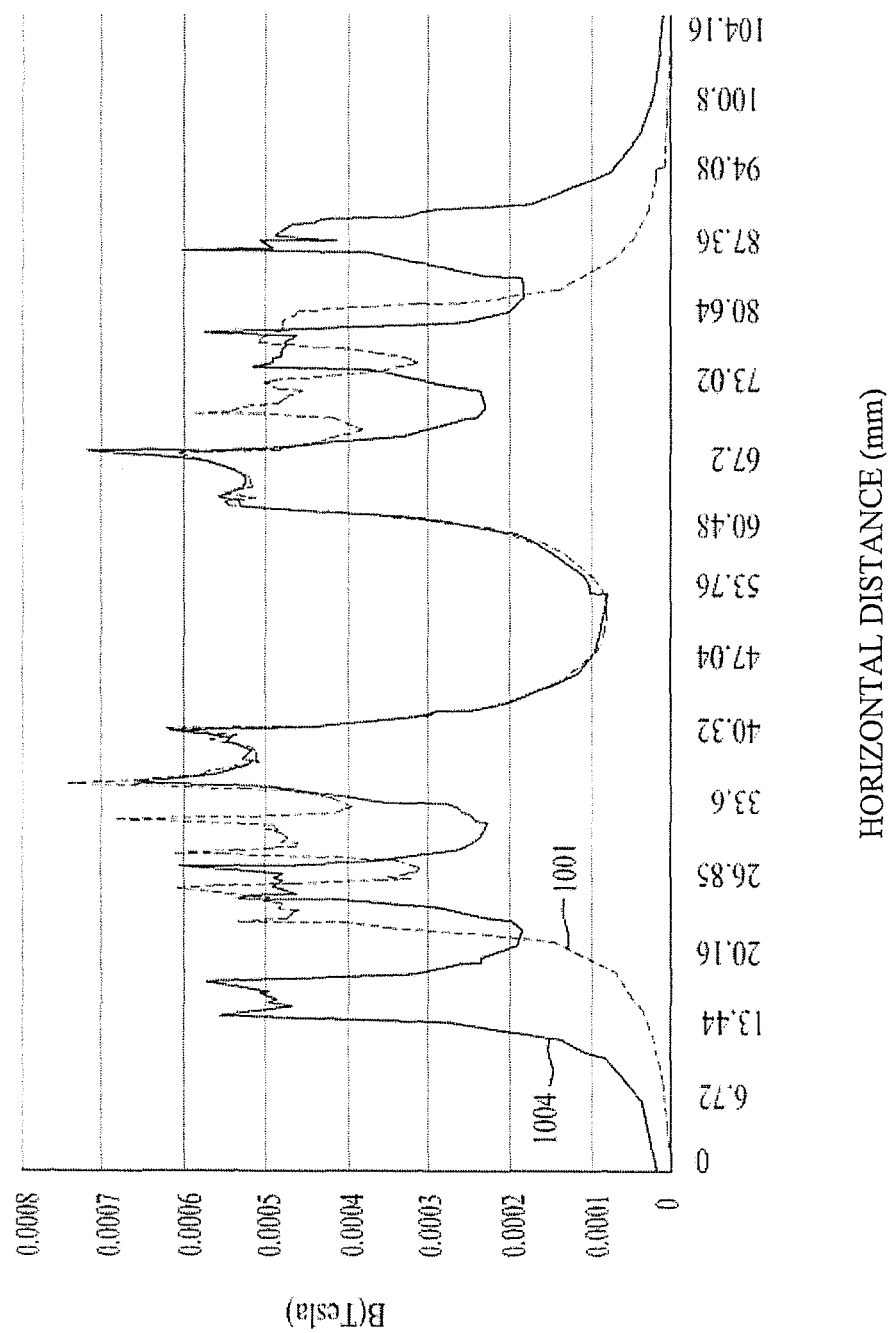
FIG. 12 is a chart that illustrating characteristics of the magnetic field of FIGS. 11A and 11D, respectively.

FIGS. 10 to 12 are diagrams for the simulations results of variation of magnetic fields strength depending on increasing a space between coil bundles. FIG. 10A shows structures of coils according to one embodiment of the present disclosure. In particular, the winding counts of first to third coil bundles of each of the coils 1001, 1002, 1003, 1004 are 5 times, 2 times and 3 times, respectively. In the coil 1001 shown in FIG. 10A, a space (or gap) between the coil bundles is 5 mm each. And, the space increases by 1 mm in the rest of the coils shown in FIGS. 10B to 10D in turn.

FIGS. 11A to 11D show simulation results of the coils shown in FIGS. 10A to 10D. The simulation is performed by applying a current of 1 A and a frequency of an applied power is 150 kHz to each of the coils shown in FIGS. 10A to 10D. Here, a lighter shade corresponds to a weaker magnetic field and a darker shade corresponds to a stronger magnetic field. Referring to the simulation results, it can be observed that the magnetic field strength decreases despite that the magnetic field is distributed in a wider area in proportion to a space between the coil bundles. This is described in detail with reference to FIG. 12 as follows.

Figure 10D:
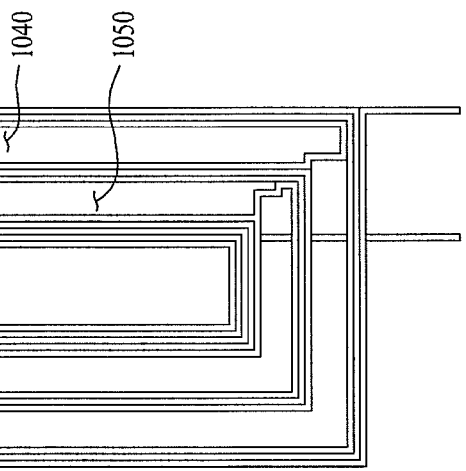
FIGS. 10A to 10D are diagrams that illustrate coils having increasing spacing between coil bundles.
Figure 10C:
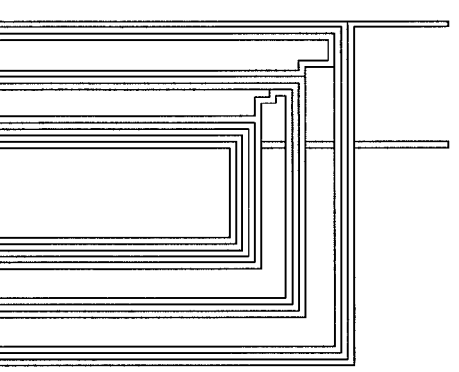
Figure 10B:
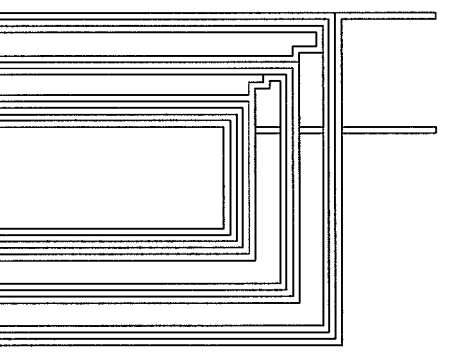
Figure 10A:
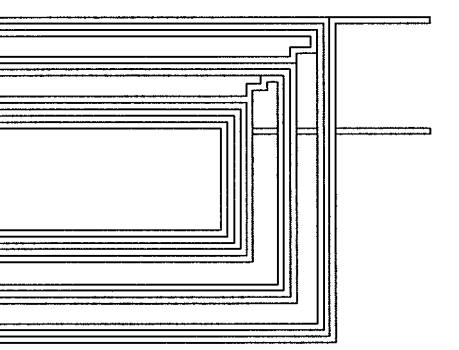

FIG. 12 is a graph that illustrates magnetic field distribution of the simulation result with reference to a horizontal direction of each of the coil structures in the simulations of the coils shown in FIG. 10A and FIG. 10D. In this case, a horizontal axis indicates a distance in a horizontal direction and a vertical axis indicates a strength of a magnetic field. Here, units of the horizontal and vertical axes are mm and Tesla, respectively.

In this graph, the dotted line corresponds to the coil 1001 shown in FIG. 10A and the solid line corresponds to the coil 1004 shown in FIG. 10D. If the space between the coil bundles gets narrower, the magnetic field strength in the space (e.g., the first area and/or the second area) between the coils gets stronger. Yet, the magnetic field is distributed in a narrower area. Therefore, it is possible to adjust or control a size of the area of the magnetic field (e.g., area of the wireless charging pad) and/or a strength of the magnetic field by adjusting the space between the coil bundles.

Figures 14A, 14B:
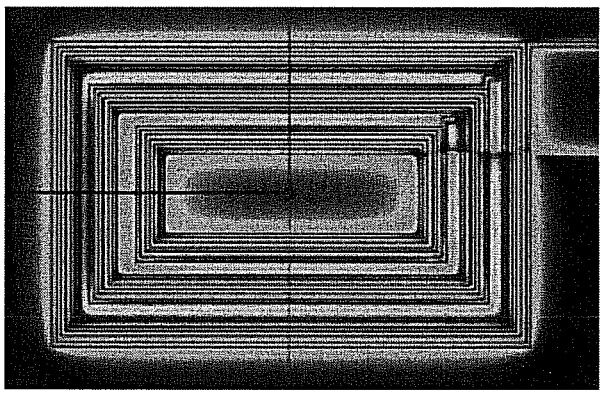
FIGS. 14A to 14D are diagrams that illustrate the electromagnetic field generated by the coils of FIGS. 13A to 13D, respectively.
Figures 14C, 14D:
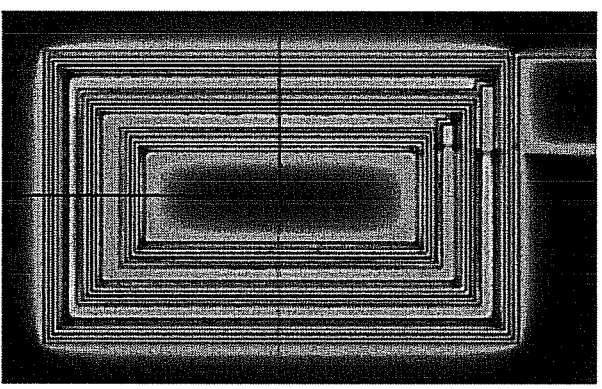
Figure 15:
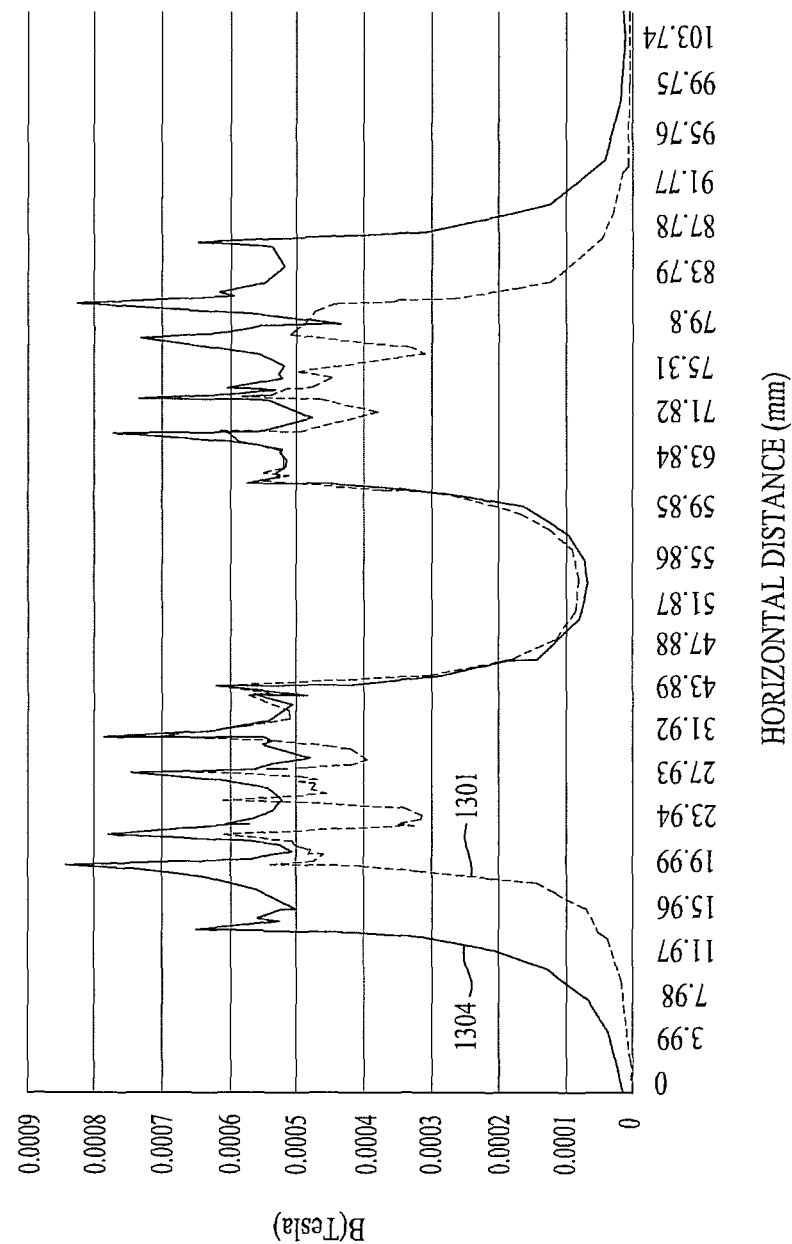
FIG. 15 is a chart that illustrates characteristics of the magnetic field of FIGS. 14A and 14D, respectively.

FIGS. 13 to 15 are diagrams for simulation results illustrating variation of magnetic field strength depending on increased count of coil windings. FIG. 13A shows coils having different structures according to one example. In particular, the winding counts of first to third coil bundles of the coil 1301 shown in FIG. 13A are 5 times, 2 times and 3 times, respectively. In the coils 1302, 1303, 1304 shown in FIG. 13B to 13D, the winding counts of the second coil bundle and the third coil bundle are incremented in turn by one time each.

FIGS. 14A to 14D show simulation results of the coils shown in FIGS. 13A to 13D. The simulation is performed by applying a current of 1 A and a frequency of an applied power is 150 kHz to each of the coils shown in FIGS. 13A to 13D. Here, a lighter shade corresponds to a weaker magnetic field and a darker shade corresponds to a stronger magnetic field. Referring to the simulation results, it can be observed that the magnetic field strength increases in the first area 1340, and the second area 1350 in proportion to the winding count of the corresponding coil bundles.

FIG. 15 is a graph magnetic field distribution of the simulation result with reference to a horizontal direction of each of the coil structures in the simulations of the coils shown in FIG. 13A and FIG. 13D. In this case, a horizontal axis indicates a distance in a horizontal direction and a vertical axis indicates a strength of a magnetic field. And, units of the horizontal and vertical axes are mm and Tesla, respectively.

In this graph, the dotted line corresponds to the coil 1301 shown in FIG. 13A and the solid line corresponds to the coil 1304 shown in FIG. 13D. If the winding count of the coil increases more, the magnetic field can be formed in a wider area, and more particularly, a strength of the formed magnetic field can be made stronger. Therefore, it is possible to adjust or control a size of the area to be used and/or a strength of an induced magnetic field to be used in a manner of adjusting the winding count of the coil.

Considering the foregoing simulation results shown in FIGS. 10 to 15, in order to increase an area of a magnetic field generated, a method of increasing a space between coil bundles may be used. Moreover, a magnetic field strength, which may be reduced due to increased space between the coil bundles, may be supplemented by incrementing the winding count of the coil. In particular, the increasing space between the coil bundles may be proportional to the winding count as represented in Formula 1:

$$d \alpha N \qquad (1)$$

where d represents a distance of the space between coil bundles and N represents the winding count of a coil bundle.

As broadly described herein, embodiments of the present disclosure provide various effects and/or features. According to at least one of embodiments of the present disclosure, a strength of a magnetic field can be evenly distributed by the coil structure. According to at least one of embodiments of the present disclosure, a power can be efficiently delivered in the course of wireless charging using a magnetic field.

As broadly described and embodied herein, provided is a coil having a prescribed structure that substantially obviates one or more problems due to limitations and disadvantages of the related art. One object of the present disclosure is to provide a coil, by which strength of a magnetic field can be evenly distributed. Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, in one embodiment a coil, which forms an induced magnetic field by winding a conducting wire may include a first coil bundle configured in a manner of winding a first conducting wire at least one time in a first direction, a second coil bundle configured in a manner of winding a second conducting wire at least one time in a second direction, and a connecting part electrically connecting the first conducting wire and the second conducting wire to each other, wherein the second coil bundle is provided inside the first coil bundle.

The first direction may be either clockwise or counterclockwise and the second direction may be opposite to the first direction. The coil may further include at least one separate coil bundle formed by winding the conducting wire. A prescribed space may be formed inside the first coil bundle by winding the first conducting wire and the second coil bundle may be located in the prescribed space. Moreover, the second coil bundle may be located in the prescribed space while spaced apart from the first coil bundle by leaving a prescribed gap in-between. In this case, the prescribed gap may be formed in proportion to a winding count of the first coil bundle and a winding count of the second coil bundle.

Any methods described herein can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A coil for forming an induced magnetic field, comprising:
   a first coil bundle formed of a first conducting wire wound in a first direction, the first coil bundle having an inner space of a prescribed inner width;
   a second coil bundle formed of a second conducting wire wound in a second direction, the second coil bundle having a prescribed outer width that is smaller than the inner width of the first coil bundle;
   a third coil bundle formed of a third conducting wire, wherein the third conducting wire of the third coil bundle is wound in the same direction as first conducting wire of the first coil bundle and in an opposite direction as the second conducting wire of the second coil bundle; and
   a connector that electrically connects the first conducting wire, the second conducting wire and the third conducting wire to each other,
   wherein the second coil bundle is provided in the inner space of the first coil bundle and the third coil bundle is provided in an inner space formed in the second coil bundle,
   wherein a first prescribed gap is provided between an inner surface of the first coil bundle and an outer surface of the second coil bundle, and a second prescribed gap is provided between an inner surface of the second coil bundle and an outer surface of the third coil bundle, and
   wherein a size of the first prescribed gap is proportional to a number of turns of the first and second coil bundles, and a size of the second prescribed gap is proportional to a number of turns of the second and third coil bundles.

2. The coil of claim 1, wherein the first direction is either clockwise or counterclockwise and the second direction is opposite to the first direction.

3. The coil of claim 1, wherein at least one of the first or second coil bundles have a prescribed shape that is formed by winding the respective conducting wire to have the prescribed shape.

4. The coil of claim 1, wherein the inner space is formed inside the first coil bundle by winding the first conducting wire.

5. The coil of claim 1, wherein the first coil bundle is formed to have a prescribed shape that corresponds to a prescribed shape of the second coil bundle.

6. The coil of claim 5, wherein the first coil bundle has a quadrangular shape and the second coil bundle has a quadrangular shape in proportion to the quadrangular shape of the first coil bundle.

7. The coil of claim 6, wherein the first and second coil bundles have a planar quadrangular shape.

8. The coil of claim 7, wherein the first conducting wire is wound in a direction opposite the second conducting wire.

9. The coil of claim 8, wherein a gap between an inner edge of the first coil bundle and an outer edge of the second coil bundle is proportional to a number of turns of the first coil bundle and a number of turns of the second coil bundle.

* * * * *